US008664298B1

(12) United States Patent
Ou et al.

(10) Patent No.: US 8,664,298 B1
(45) Date of Patent: *Mar. 4, 2014

(54) SELF-HEALING POLYMER NANOCOMPOSITE COATINGS FOR USE ON SURFACES MADE OF WOOD

(75) Inventors: Runqing Ou, Bridgewater, NJ (US); Kenneth Eberts, Westfield, NJ (US); Ganesh Skandan, Easton, PA (US); Sau Pei Lee, Edison, NJ (US); Robert Iezzi, Stone Harbor, NJ (US); Daniel E. Eberly, Mine Hill, NJ (US)

(73) Assignee: NEI Corporation, Somerset, NJ (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/210,321

(22) Filed: Aug. 15, 2011

Related U.S. Application Data

(63) Continuation-in-part of application No. 12/977,164, filed on Dec. 23, 2010.

(60) Provisional application No. 61/374,146, filed on Aug. 16, 2010.

(51) Int. Cl.
*C08K 9/00* (2006.01)

(52) U.S. Cl.
USPC ............................ 523/206; 523/205; 523/215

(58) Field of Classification Search
USPC .......................................... 523/205, 206, 215
See application file for complete search history.

(56) References Cited

U.S. PATENT DOCUMENTS

| | | | |
|---|---|---|---|
| 4,808,255 A * | 2/1989 | Markevka et al. ......... | 156/307.3 |
| 4,820,368 A * | 4/1989 | Markevka et al. ......... | 156/307.3 |
| 5,443,674 A * | 8/1995 | Fresonke et al. ........... | 156/331.7 |
| 5,492,765 A * | 2/1996 | Vratsanos et al. ............ | 428/461 |
| 6,577,796 B2 * | 6/2003 | Anelli et al. .................. | 385/112 |
| 8,137,754 B2 * | 3/2012 | Lai et al. ...................... | 427/325 |

* cited by examiner

*Primary Examiner* — James J Seidleck
*Assistant Examiner* — Peter A Salamon
(74) *Attorney, Agent, or Firm* — William L. Botjer

(57) ABSTRACT

Phase separated self-healing polymeric wood coatings having a "biphasic" thermoset/thermoplastic morphology to achieve self-healing. The biphasic structure has: (i) a major "load-bearing" thermoset phase that has superior strength and performs major mechanical and structural functions, and (ii) a "self-healing" phase of a thermoplastic healing agent to repair the material and restore its mechanical and structural integrity after being damaged. The phase-separated morphology is achieved through phase separation via a reaction process. Methodologies for achieving the above mentioned "biphasic" structure in solvent borne thermally cured resin, waterborne resin, and solvent borne UV-curable resin are described.

26 Claims, 3 Drawing Sheets

Before Healing

After Healing

Before Healing          After Healing

10% PCL

20% PCL

30% PCL

SELF-HEALING POLYMER NANOCOMPOSITE COATINGS FOR USE ON SURFACES MADE OF WOOD

This application is a continuation in part of U.S. patent application Ser. No. 12/977,164 filed Dec. 23, 2010 and claims the priority of U.S. provisional patent application Ser. No. 61/374,146, filed Aug. 16, 2010, titled, 'SELF-HEALING POLYMER NANOCOMPOSITE COATINGS FOR USE ON SURFACES MADE OF WOOD', the contents of which are herein incorporated by reference.

STATEMENT OF GOVERNMENT SUPPORT OF INVENTION

The work leading to the present application was done as part of a DoE SBIR Phase I grant no. DE-FG02-08ER85101 and Phase II grant no. DE-FG02-08ER85101. The Government has certain rights in the invention.

BACKGROUND OF THE INVENTION

The inherent strength and beauty of natural wood is easily compromised upon exposure to the environment due to poor surface stability and weatherability. A polymer coating imparts two important functions to the underlying wood substrate: the aesthetic function enhances the appearance of the natural wood grain while the protective function preserves these aesthetics by preventing damage from solvents, moisture, heat, decay and mechanical sources. Properly protected and maintained wood can last for a long time, but finished wood typically must endure periodic refinishing which can be costly and damaging to the underlying wood. Thus, maximizing the durability of the protective finish is paramount to providing optimal protection. Due to routine wear and tear, surface scratches are generated which develop micro-cracks, eventually leading to macroscopic damage that causes the coating to lose its aesthetic and protective functions. The use of a self-healing coating will increase the operational life of coatings and eliminate the need to frequently refinish damaged coatings. In addition to tremendous cost savings, this results in significant energy savings from fabrication and application of the coating materials and conserves supplies of raw wood, an important natural resource.

When a polymer coating is mechanically damaged, it is either plastically deformed at the surface (such as a blunt indent or a light scratch), or cracked (such as a cut made with a sharp blade). The majority of existing self-healing technologies do not target both forms of damage. One is neglected at the expense of the other. An example is the polyurethane based self-healing coating developed by Bayer Material Science for the automotive industry [van Benthem, R.; Ming, W.; de With, G., "Self Healing Polymer Coatings," In *Self Healing Materials,* 2007, pp 139-159; http://www.bayercoatings.com/BMS/DBRSC/BMS_RSC_CAS.nsf/id/COEN_7EAClearcoat]. They utilized the shape memory effect (termed as "reflow effect") to recover plastic deformation, for example the scratch from a car wash. There is no "self-healing" in the case of cracking or micro-cracking due to the lack of chemical or physical forces to "re-bond" the newly generated crack surfaces. On the other hand, Cho et al. [Cho, S. H.; White, S. R.; Braun, P. V., "Self-Healing Polymer Coatings," *Advanced Materials,* 21, (6), 645-649, (2009).] developed a coating containing encapsulated healing agents and catalysts that specifically tackles crack healing/re-bonding, based on their previous success with bulk self-healing polymers using the same strategy [White, S. R.; Sottos, N. R.; Geubelle, P. H.; Moore, J. S.; Kessler, M. R.; Sriram, S. R.; Brown, E. N.; Viswanathan, S., "Autonomic healing of polymer composites," *Nature,* 409, (6822), 794-797, (2001).]. A surface crack made by hand scribing with a sharp razor blade ruptures the capsules and triggers the crosslinking of the released healing agent to seal the crack. This strategy is only applicable to healing cracks, since the formation of a crack is necessary to rupture the capsules where no capsules are likely to be ruptured (therefore no healing agent released) during plastic deformation. Besides, the large size of the microcapsules (50 μm and above) limits the use of this technology in many self-healing coatings. A similar methodology uses hollow fibers [Dry, C., Comp. Struc., "Procedures developed for self-repair of polymer matrix composite materials," 35, 263-269 (1996).] or interconnected microchannels [Toohey, K. S.; White, S. R.; Sottos, N. R., "Self-healing polymer coatings," Proc. 2005 SEM annual conference and exposition on experimental and applied mechanics, 2005, p 241-244.] to store the healing materials. Fabrication of microvascular network is a challenge, which limits its application. Besides polymerization based healing, reversible chemistry based on Diels-Alder reaction [Chen, X. X.; Dam, M. A.; Ono, K.; Mal, A.; Shen, H. B.; Nutt, S. R.; Sheran, K.; Wudl, F., "A thermally re-mendable cross-linked polymeric material," *Science,* 295, 1698-1702, (2002).], hydrogen bonded supramolecular network [Cordier, P.; Tournilhac, F.; Soulie-Ziakovic, C.; Leibler, L. *Nature,* 451, 977-980, (2008).], and ionic liquids [Long, T., "Ionic Liquid and Ion-Containing Polymers for Shape Memory and Self-healing." Lecture at Smart Coatings 2009.] has been utilized for producing healable polymer materials. All of these are limited to a narrow set of less commonly used polymers, rendering widespread utilization of the technology unlikely. A unique approach among these methods is a thermoset/thermoplastic mixture that offers crack sealing capacity when the material is heated, and the thermoplastic is able to diffuse across the crack boundary [Jones, F. and Hayes, S. A., "Self Healing Composite Material", WO 2005/066244 A2.]. However, in this system, the thermoset and thermoplastic are miscible, e.g., they form a single phase. When two polymers having different glass transition temperatures ($T_g$) are blended into a single phase material, a single glass transition temperature exists, which takes a value in between the glass transition temperatures of the two composing polymers. This means that adding a miscible thermal plastic to the thermoset lowers its glass transition temperature, and hence the mechanical performance such as hardness. Most recently, researchers from University of Southern Mississippi invented a polyurethane based self-healing material by mixing chitosan into the compound [http://www.msnbc.msn.com/id/29663741/from/ET/.]. Upon exposure to UV light, chitosan rods are broken up and bond to each other across the damaged area. A drawback of this technology is that repeated healing is not possible.

Bayer Material Sciences, supplier of polyurethane resins for acrylic-polyurethane and all-polyurethane clearcoats, developed self-healing polyurethane automobile topcoats that self heal small scratches. The self-healing mechanism is based on physical deformation of a thermoset polymer network. When a small physical deformation occurs on a clear automobile topcoat such as that induced by a car wash, integrity of the coating is compromised. When a gentle heat treatment such as a hot afternoon sunshine brings the surface temperature to above the glass transition temperature of the polymer, the physically deformed network restores to its original shape and therefore heals the minor surface scratches. The coating will not self-heal more severe damages such as incurred by a car key scratch where the polymer network is broken.

SUMMARY OF THE INVENTION

The present invention overcomes the challenges of previous self-healing coating technology by utilizing a biphasic thermoset/thermoplastic morphology. The technology not only heals plastic deformations caused by fine scratches but also deep cracks as well. Other advantages include multiple healings, maintaining high gloss, commercial viability due to the use of inexpensive materials. Nanoparticles can be added to improve the mechanical properties of the wood coating. Although the technology was developed based on a polyurethane wood coating system, the same principles can be applied to other polymeric wood coatings as well. A polyurethane wood coating is used as an example throughout the specification.

The present invention is directed to the use of a unique biphasic thermoset/thermoplastic morphology to achieve self-healing. The "biphasic" structure consists of: (i) a major "load-bearing" thermoset phase that has superior strength and performs major mechanical and structural functions, and (ii) a "self-healing" phase of a thermoplastic flowable healing agent to repair the material and restore its mechanical and structural integrity after being damaged. The phase-separated morphology can be achieved through a "phase separation via reaction process". This unique morphology encompasses both the strength of a thermoset and the healing ability of a thermoplastic.

A thermoplastic material becomes liquid like above its glass transition or meting temperature (for semicrystalline thermal plastic polymer). This property can be utilized for self-healing purposes. However, a thermoplastic material loses its strength and integrity above its glass transition temperature. This is a contradiction. The coating cannot simultaneously possess the property of free flowing in order to self-heal and the property of withstanding flow in order to feel hard. The dilemma is resolved in the present invention by a biphasic thermoset/thermoplastic morphology. A phase separated thermoset/thermoplastic coating displays two glass transition temperatures: a high glass transition temperature similar corresponding to the thermoset phase and a low glass transition temperature corresponding to the thermoplastic phase. This allows both phases to perform their functions. The high $T_g$ phase will provided the strength and stability while the low $T_g$ phase will have enough mobility to heal the microcracks when needed. A miscible single phase blend, on the other hand, will have compromised mechanical properties and limited mobility.

The present invention is directed to the use of phase separation via reaction to achieve a biphasic morphology. This method has several advantages compared to mechanical mixing. First, it results in a homogeneous dispersion of the second phase by an in-situ process, thus eliminating the surface functionalization of thermoplastic particles. Second, the morphology and domain size of the second phase can be controlled by varying the different processing parameters: type of curing agent, curing temperature and molecular weight of the thermoplastic. The polymer chemistry can be easily scaled-up to produce commercially viable products.

Phase separation via reaction is often used to generate a thermoplastic phase in a brittle thermoset bulk material such as epoxy to toughen the thermoset. Phase separation via reaction is generally not used in a coating for several reasons. First, toughness is usually not as important in a coating as it is in a bulk material. It is the hardness that is usually a top priority. Because of the hardness concern, a thermoplastic material is not usually added to a coating formulation. In cases where thermoplastic is needed, it is chosen such that it is miscible with the thermoset. This ensures the transparency of the coating which is important because the aesthetic function of a coating is as important as its protective function. Adding a phase separated thermoplastic to the coating is counterintuitive to meeting the requirements of a coating. The present invention resolves the difficulty by controlling the scale of the phase separated morphology to maintain gloss. When the scale of the phase separated feature is smaller than the wavelength of visible light, scattering of light can be greatly reduced. Another unique feature of the invention described here is the ability of the self-healing coating to also have high gloss characteristics, an attribute critical for use as wood coatings. Further, the high initial gloss values are restored upon self-healing.

The nanoparticles can be added to the self-healing wood coating to enhance the mechanical properties, so there is no loss of hardness and related mechanical properties due to the presence of the thermoplastic. Surface functionalized inorganic nanoparticles are introduced to the system to selectively reside in the thermoplastic phase and strengthen its mechanical properties. When nanoparticles are well dispersed in the matrix, coating transparency will not be affected.

We have demonstrated a phase-separated morphology and self healing properties in a polyurethane based coating system. A polyurethane coating was chosen because of its popularity and excellent properties. Polycaprolactone (PCL) was the thermoplastic polymer used. The approach is generic and can be implemented with other incompatible thermoset/thermoplastic blends as well, provided the biphasic morphology is adjusted by the composition and synthesis conditions such as the curing temperature and pressure, etc. Thermoset materials that may be used for coatings in accordance with this invention include: polyurethane, epoxy, bis-maleimide, phenol-formaldehyde, urea-formaldehyde, melamine-formaldehyde, polyimide, alkyd, unsaturated polyester, silicone, fluoropolymers, and polyvinyl formal and blends thereof. Thermoplastic materials that may be used as healing material in the coatings include: polyester, e.g. polycarplactone, poly(acrylic acid), poly(acrylonitrile), poly(ether ketone), polystyrene, thermoplastic polyurethane, poly(vinyl acetate) and blends thereof.

To compensate for the softness of the PCL phase, we incorporated nanoparticles to reinforce the PCL phase. The nanoparticles can be, but are not limited to the following: an organo-modified clay, metal oxide, organo-modified metal oxide, graphene, and carbon nanotubes. A special nanoparticle that can be useful is a PCL grafted alumina, which is naturally compatible with the PCL phase.

VOC (Volatile organic compounds) regulatory compliance is becoming an increasingly important force in the coatings industry and a self-healing wood coating technology would be incomplete if we failed to provide an environmentally friendly solution. We developed a waterborne polyurethane based self-healing coating for use on wood utilizing the same bi-phasic structural concept described earlier. However incorporating a thermoplastic component into a waterborne resin and still maintaining a phase-separated structure and requiring the phase-separated features to be submicron proved to be a great technical challenge. This is because the thermoplastic self-healing component (PCL) is hydrophobic and is simply incompatible with water. Directly mixing a PCL solution with a waterborne polyurethane resin would result in precipitation of PCL (if the solvent used to dissolve PCL is water soluble such as THF) or separation into an organic layer and an aqueous layer (if the solvent used to dissolve PCL is not soluble in water as most organic solvents). Even if PCL and the polyurethane latex particles are somehow combined (through the use of extra surfactant, which is not desired), the phase separated structure below one micron scale cannot be achieved.

The present invention teaches incorporating PCL into the monomers of polyurethane prior to polymerization, thus producing a homogeneous solution of polyol, PCL and isocyanate along with other ingredients. After a polyurethane prepolymer is formed, the liquid mixture is poured into water to form a dispersion. A chain extender (amine) is then added to the water dispersion to grow the polyurethane chains into a high molecular weight network. Phase separation of the thermoplastic PCL and the thermoset polyurethane occurs at the later stage of polymerization.

This procedure allows the formation of a stable emulsion that can be cured into a self-healing wood coating. There are several characteristics of the emulsion: (i) it is stable and can be sold as a commercial product. We have observed that the emulsion remains stable on the shelf for months without any signs of settlement. (ii) It forms a coating with a thermoplastic/thermoset biphasic structure, with the thermoset being the load bearing phase and the thermoplastic as the self-healing phase. (ii) Phase separation occurs at a later stage polymerization, which allows a uniform distribution of the two phases. (iii) Phase separated features are submicron, which is important to maintaining a transparent coating. This is only possible through a phase separation via reaction process.

An important step in producing a stable polyurethane emulsion is pouring the resin liquid into water. The viscosity of the resin has to be controlled and ionic groups have to be introduced to the polyurethane backbone to stabilize the latex particles. We have found that when PCL was introduced to the polyurethane resin, viscosity of the resin dramatically increased and pouring became problemetic. Frequently we found that the PCL loaded polyurethane prepolymer resin wrapped around the stirring shaft or precipitated out as large chunks of solid resin.

The present invention uses a special diisocyanate monomer provided by Cytec Industries Inc. for the polymerization reaction of polyurethane. This monomer, Meta-Tetramethylxylylene Diisocyanate (TMXDI), has a very low rate of reaction with water compared to other diisocyanate monomers that are regularly used in the coatings industry. This allows pouring the resin at a higher temperature (85° C.) without causing significant side reactions between isocyanate groups with water. In addition, this monomer prevents the formation of hydrogen bonding in the resin that is prevalent in other diisocyanate based resins. The higher pouring temperature and the lack of hydrogen bonding significantly reduce the viscosity of the PCL loaded polyurethane prepolymer resin so that pouring the resin into water becomes possible.

The present invention makes use of a pre-neutralization procedure when pouring the resin into water. In this procedure, the polyurethane prepolymer is pre-neutralized with triethylamine before it is poured into water. This is different from the more commonly used procedure where triethylamine is added in water first before the resin is poured into water. This procedure significantly helps achieving a stable emulsion. We have found that neutralization in the water phase (the more common procedure) caused significant wrapping of resin onto stirring shaft and precipitation of resin.

The present invention also uses a lower molecular weight PCL as the thermoplastic component. We found that using PCL with a molecular weight of 14,000 as opposed to the molecular weight of 42,000 used in the solvent borne coating formulation plus the above mentioned adjustments (use of TMXDI monomer, pre-neutralization) eliminated the problems of resin wrapping onto stirring shaft and resin precipitation. Depending upon the application, the molecular weight of the thermoplastic can be in the range of 1000 to 100,000 and preferably between 10,000 to 50,000.

BRIEF DESCRIPTION OF THE DRAWINGS

Various embodiments of the invention will hereinafter be described in conjunction with the appended drawings, provided. To illustrate and not to limit the invention, wherein like designations denote like elements, and in which.

DESCRIPTION OF THE PREFERRED EMBODIMENTS

Figure 1:
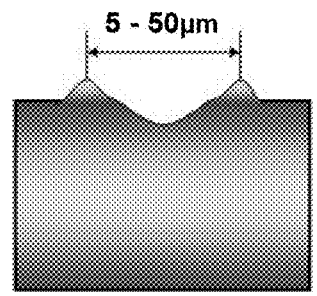
FIG. 1 is a schematic of typical scratches generated during mar testing.

The self healing wood coating that we have developed is a polyurethane based coating with a thermoplastic healing material (PCL) and nanoparticles incorporated into the coating. Through a unique phase separation via reaction process, the thermoplastic PCL and the thermoset polyurethane form a phase separated morphology with the phase separated features controlled so as to be well under 1 micron in size. A typical grade PCL has a molecular weight (number average) between 10,000 and 90,000. Depending upon the molecular weight, the phase separated morphology can be different. The PCL used in the examples had a molecular weight (number average) of between 10,000 to 42,000. The thermoplastic PCL content in these coatings is between 10 wt % and 30 wt %, more preferably between 10 wt % and 20 wt %.

The chemistry of polyurethane based wood coating is versatile and generally polyurethane wood coating can be broadly classified into solvent borne coating, water borne coating, UV-curable solvent borne coating, and UV-curable water borne coating. We have incorporated PCL into a solvent borne coating, water borne coating, UV-curable solvent borne coating, and demonstrated self-healing in all the coatings. However, since the chemistry and the dispersion media are different for different types of coatings, the methodology for adding the thermoplastic plastic component is different.

In a solvent borne coating, PCL is dissolved in a solvent. This is combined with the polyol component of the polyurethane. A single phase solution results. After polyisocyanate is added and the coating mixture is heated, a reaction between the OH groups of the polyol and isocyanate groups on the polyisocyanate starts the polymerization reaction, leading to the formation of a high molecular weight polyurethane network. Meanwhile, as polymerization progresses, PCL and polyurethane start to phase separate and phase separation continues until the phase separated structure is immobilized by gelation and vitrification during curing when the viscosity of the system reaches such a point that phase separation stops.

In a water borne coating, PCL is dissolved in polyol at an elevated temperature before isocyanate monomer is added to the mixture. After reaction for an extended period of time, a transparent viscous prepolymer liquid forms and this is poured into vigorously stirred water to obtain a stable emulsion. When chain extenders (amines) are added to the emulsion, polymerization continues as the molecular weight of polyurethane builds up and phase separation occurs. The end result is a dispersion of phase separated polyurethane/PCL latex particles.

The steps for providing a water borne self-healing coating are summarized below:

1) A thermoplastic polycaprolactone (PCL) is mixed with a polyol or a mixture of polyols (Formrez 55-112, Formrez 55-225). The polyol can be chosen from either polyether based polyols or polyester based polyols. Polyether polyols are made by reacting epoxides like ethylene oxide and propylene oxide. Common polyether diols are polyethylene glycol, polypropylene glycol, poly(tetramethylene ether) glycol. Polyester polyols are formed by condensation polymerization between diols and dicarboxylic acids. Alternatively, the hydroxyl group and the carboxylic acid may be within the same molecule such as caprolactone. The diols used for the preparation of polyester polyol include ethylene glycol, butylene glycol, neopentylglycol, hexane-1,6-diol, dimethylolcyclohexane, and 2,2-bis(4-hydroxycyclohexyl)propane. Examples of suitable acids for preparation of polyester polyol are phthalic acid, isophthalic acid, terephthalicacid, tetrahydrophthalic acid, hexahydrophthalic acid, succinic acid, adipic acid, azelaic acid, sebacic acid, maleic acid, glutaric acid, hexachloroheptanedicarboxylic acid, and succinic acid. The thermoplastic PCL serves as a self-healing agent because it is flowable above its melting temperature. However, the thermoplastic PCL cannot be mixed with the commercially available thermoset polyurethane emulsion because PCL does not dissolve in water. PCL has to be introduced to polyol, which is a precursor component of the thermoset polyurethane, at the monomer stage before the thermoset polymer is formed.

2) 2,2-Bis(hydroxymethyl)-propionic acid (DMPA) and 1,1,1-Tris(hydroxymethylpropane) (TMP) are then added to the mixture. DMPA is an acid group containing diol that can be incorporated into the polyurethane chain. When the acid group is neutralized by a tertiary amine, it provides a carboxylic group with a negative charge that can stabilize the emulsion particles in water. Among dihydroxyl carboxylic acids, DMPA is the most often encountered in the literature. Other examples of dihydroxyl carboxylic acids include 2,3-dihydroxyl propionic acid, 2,2-bis(hydroxymethyl)propionic acid, dimethylol buanoic acid, 2,2-bis(hydroxymethyl) butyric acid (DMBA), dihydroxybenzoic acid, and dihydroxysuccinic acid. Besides dihydroxyl carboxylic acids, dihydroxyl sulfonates can also be used as an internal emulsifier for waterborne polyurethane synthesis. Examples of dihydroxyl sulfonates include 2,3-dihydroxypropane-1-sulfonic acid and 1,4-dihydroxybutanesulfonic acid. TMP is a crosslinker molecule which has three hydroxyl groups and when incorporated into the polyurethane chain affords the network characteristics of the thermoset polyurethane. Typical crosslinkers are trimethylolpropane (TMP), trimethylolethane (TME), trimethylolbutane (TMB), and glycerol.

3) Meta-Tetramethylxylylene Diisocyanate (TMXDI) monomer (from Cytec Industries Inc.) is then added to the mixture. TMXDI is a unique isocyanate that has low reactivity with water and significantly lower prepolymer viscosity. This monomer is a very suitable choice of the self-healing coating system because the existence of thermoplastic polymer increases the system viscosity significantly. The use of TMXDI allows the viscosity of the system to be manageable without adding large amounts of solvents. Structurally, TMXDI is an aliphatic isocyanate because the NCO group is not conjugated to the aromatic ring. This affords excellent light stability and exterior durability. In addition, steric hindrance provided by dimethyl groups lowers reactivity and reduces hydrogen bonding, leading to lower reactivity with water and significantly lower prepolymer viscosity. While other diisocyanate monomers, such as trimethylene diisocyanate, tetramethylene diisocyanate, pentamethylene diisocyanate, hexamethylene diisocyanate, propylene diisocyanate, ethylethylene diisocyanate, 2,3-dimethylethylenediisocyanate, 1-methyltrimethylene diisocyanate, cyclopentylene 1,3-diisocyanate, cyclohexylene 1,4-diisocyanate, cyclohexylene 1,2-diisocyanate, phenylene 1,3-diisocyanate, phenylene 1,4-diisocyanate, toluoylene 2,4-diisocyanate, toluoylene 2,6-diisocyanate, biphenylene 4,4'-diisocyanate, naphthylene 1,5-diisocyanate, naphthylene 1,4-diisocyanate, 1-isocyanatomethyl-5-isocyanato-1,3,3-trimethylcyclohexane, bis-(4-isocyanatocyclohexyl)methane, bis-(4-isocyanatocyclophenyl)methane, 4,4'-diisocyanatodiphenylether, 2,3-bis-(8-isocyanatooctyl)-4-octyl-5-hexylcyclohexene, trimethylhexamethylene diisocyanates, tetramethylxylylene diisocyanates, may be used in place of TMXDI, it has been found that the low reactivity with water and lowered prepolymer viscosity make it particularly suitable and promising for the self-healing waterborne coating developed here. Since the amount of isocyanate added is more than the OH groups (molar ratio=1.4~1.7), a prepolymer is formed with terminating isocyanate groups after reaction at 120° C. for 2 hours.

4) Thereafter a tertiary amine (triethylamine, TEA) is added to neutralize the acid groups coming from DMPA. Examples of a tertiary amine include trimethylamine, triethylamine, dimethylaniline, diethylaniline, triphenylamine, and dimethylbenzylamine. In addition, the neutralization can also be carried out with a mixture of amines. Normally, neutralization can be done in a water neutralization process or a pre-neutralization process. In the water neutralization process, tertiary amine is charged to the water. The hot prepolymer is added into the water with agitation while simultaneously neutralizing and dispersing the prepolymer. In the pre-neutralization process, tertiary amine is added to the prepolymer prior to dispersing it in water. Through experiments we found that the water neutralization procedure did not work in our system because wrapping of the prepolymer onto stirring shaft occurred. Pre-neutralization solves the problem.

5) The pre-neutralized hot prepolymer/thermoplastic (PCL) mixture is then poured into water with agitation, resulting in an emulsion.

6) A chain extending amine, 2-methyl-1,5-pentanediamine (Dytek A, obtained from Aldrich), is then added to the emulsion. The chain extending amine is charged into water dropwise and reacting with the prepolymer, forming high molecular weight polyurethane polyuria polymer in water. Examples of chain extending amines include diethanolamine, di-n-propanolamine, diisopropanolamine, diethylenetriamine, triethylenetetraamine, and 1,3-diaminopentane (DAMP).

7) The emulsion is then coated on the wood.

8) The emulsion is cured by drying for one hour at room temperature and aging at 60° C. for 4 hours so as to form a structure wherein the thermoset forms a load-bearing phase performing major mechanical and structural functions and the thermoplastic forms a self-healing phase to repair cracks and other damages in the material to restore its mechanical and structural integrity after damage and wherein the structure is formed by phase separation via the curing reaction.

In a UV-curable solvent borne coating, PCL is dissolved in a solvent and mixed with the UV-curable resin. Phase separation occurs upon UV curing.

Example 1

Preparation of Solvent Borne PU/PCL Blend

Polyurethane material was formulated using commercial saturated polyester polyol and polyisocyanate. Desmophen R 221 75 from Bayer Material Science was used as the saturated polyester polyol with an average equivalent weight of 522. Desmodur N 3390A BA/SN from Bayer Material Science was used as the aliphatic polyisocyanate with an average equivalent weight of 214. Polycaprolactone (PCL) (MW=43,000-50,000 g/mol) was purchased from Polysciences and used as-received.

PCL was first dissolved in a mixed solvent (90% butyl acetate, 10% tetrahydrofuron [THF]). The PCL solution was then mixed with the polyol, resulting in a transparent solution, before being combined with polyisocyanate. After thorough mixing and degassing, the solution was cast on a wooden substrate and baked at elevated temperature to cure the polyurethane. Procedures for preparing PU/PCL blends containing 15% PCL, which are suitable for wood clear coating, are described below.

A standard, solvent borne coating formulation was prepared as follows. In a 4 oz wide mouth jar, 2.13 g of PCL was combined with 2.13 g of THF and 25.0 g of butyl acetate. The PCL was allowed to dissolve with the aid of an ultrasonic bath. 9.53 g of Desmophen R 221 75 was then added and mixed with a magnetic stir bar to obtain a transparent solution. Finally, 3.93 g of Desmodur N 3390A and 0.26 g of a 10% BYK-301 surfactant solution in butyl acetate were added. Stirring continued for 5 minutes before application to wood substrates.

Example 2

Preparation of a Low VOC PU/PCL Blend

A low VOC (volatile organic compound) (<150 g/L VOC), solvent borne coating formulation was prepared as follows. Zero VOC thinner was first prepared by combining methyl acetate and parachlorobenzotrifluoride (PCBTF) in a 1:1 ratio by mass. In a 4 oz wide mouth jar, 2.13 g of PCL was combined with 2.13 g of THF and 25.0 g of zero VOC thinner. The PCL was allowed to dissolve with the aid of an ultrasonic bath. 9.53 g of Desmophen R 221 75 was then added and mixed with a magnetic stir bar to obtain a transparent solution. Finally, 3.93 g of Desmodur N 3390A and 0.26 g of a 10% BYK-301 surfactant solution in butyl acetate were added. The solution was mechanically stirred for 5 minutes before being applied to wood substrates.

Example 3

Preparation of Solvent Borne PU/Nanoparticle/PCL Composite

Due to the inherent softness of the PCL phase, significant reductions in film hardness were observed for the composite coatings. To address this, nanoparticles were incorporated to reinforce the PCL phase. The nanoparticles can be but not limited to the following: an organo-modified clay, metal oxide, organo-modified metal oxide, and carbon nanotubes. As an example, organically modified aluminum oxide was prepared by a 110° C. reflux reaction of alumina nanoparticles (NanoTek, Nanophase, Inc.) with an aminosilane under inert gas. These nanoparticles were then dispersed in anhydrous butyl acetate by high shear mixing. Next, a nanoparticle/PCL solvent dispersion was prepared in a glass jar by first combining PCL and butyl acetate, then adding the nanoparticle dispersion and sonicating for several minutes, followed by addition of THF. The jar was closed tightly and tape-sealed, then sonicated for 2-3 hours in warm water until a homogeneous mixture resulted. Addition of polyol followed immediately after removing the jar from the ultrasonic bath, while the contents were still warm. The jar was capped and stirred for 2-3 minutes before addition of polyisocyanate. Addition of polyisocyanate, surfactant and catalyst was followed by 2 minutes of vigorous agitation on a vortexer and 1 minute of stirring on a stir plate. The mixture was then transferred to disposable mixing cup and degassed with a centrifugal mixer for 30 seconds at 2200 RPM. Samples were prepared one at a time to ensure prompt application and maintained at a temperature of ~40° C. (until applied) as a means of viscosity control and to prevent crystallization of the PCL phase.

PCL grafted alumina nanoparticles were synthesized according to the following procedure. Alumina was obtained from Nanophase Technologies. Before the grafting reaction, the nanoscale alumina powder was dried in vacuum at 70° C. for 12 hours. 3 g of the dried alumina was dispersed in 100 mL dry toluene under a nitrogen atmosphere. Then 0.3 mL of triethylaluminum, $AlEt_3$ (25% toluene solution), was added and stirred for an additional hour at 70° C. 12 g of ε-caprolactone were be added under nitrogen, and the reaction was allowed to proceed at 70° C. for 48 hours. The polymerization was stopped by addition of diluted HCl, and the resulting PCL-grafted alumina nanoparticles were recovered after solvent and residual monomer removal by drying the mixture at 85° C. under reduced pressure for 24 hours.

Example 4

Preparation and Coating of Wood Test Panels Using Solvent Borne Self-Healing Coating Stained maple test panels were wiped thoroughly with kimwipes saturated with butyl acetate. The panels were then dried thoroughly in a mechanical convection oven for 15 minutes at 70° C. The coating was applied on a leveled drawdown plate using a wool or synthetic applicator pad which had been rinsed thoroughly with butyl acetate. The applicator pad was first saturated with coating formulation and then drawn down across the panel in a smooth motion. The coated panel was allowed to air dry for 10 minutes on the drawdown plate, and then transferred to a leveled oven rack in a gravity convection oven (preheated to 70° C.) where it was cured overnight. The panel was the allowed to cool followed by sanding with 200 grit sandpaper under light to medium pressure. The coating procedure was then repeated, beginning with the solvent wipe-down step, to complete the second and third coats. After application of the third coat, the panel was not sanded but instead aged for 4 hours at 100° C.

Example 5

Preparation of Waterborne PU/PCL Blend and Coating of Wood Test Panels

A 500 ml three neck flask was immersed in an 85° C. oil bath and 24.53 g of polyol B1 (Fomrez 55-112) and 52.74 g of polyol B2 (Fomrez 55-225) were added together with 20 g of propylene glycol monomethyl ether acetate (PGMEA). 33.54 g of PCL (molecular weight=14,000) were added and stirred until PCL was completely dissolved. Then 8.1 g of 2,2-Bis (hydroxymethyl)-propionic acid (DMPA) was added during slow stirring until a homogenious solution was obtained. At this time 1.35 g of 1,1,1-Tris(hydroxymethylpropane) (TMP) was added and stirred for 1~2 minutes. After that, 81.0 g of Meta-Tetramethylxylylene Diisocyanate (TMXDI) monomer (from Cytec Industries Inc.) were charged to the solution and the reaction temperature was increased to 120° C. After 2 hours of reaction, a urethane prepolymer was formed in the presence of PCL. The reaction temperature was decreased to 85° C. and 7.326 g of triethylamine was added to the reaction mixture and stirred for 30 minutes. Finally, the temperature was increased to 120° C. in order to decrease viscosity to allow for facile dispersion into water.

In a separate 1 liter plastic container, 445 ml deionized water, 10 g of Carbowet 13-40 surfactant, and 1 ml Byk 024 defoamer were added. The hot prepolymer resin mixture was poured slowly in a stream into the water under vigorous stirring. Stirring continued for 30 minutes after the all the resin was poured in. A 25% of amine chain extender solution was prepared and set aside by combining 14.562 g of 2-methyl-1,5-pentanediamine (Dytek A, obtained from Aldrich) and 43.7 g of de-ionized water. The amine solution was added dropwise into the dispersion. End of the reaction was determined by monitoring the disappearance of the isocyanate group (2250 cm$^{-1}$) through FTIR.

A typical coating formulation was prepared by incorporating surfactant, defoaming agent, and thickening agent into the emulsion prepared above. First 200 ppm of a water-based fluorosurfactant, Capstone FS-61, was added under moderate shear conditions for several minutes. Next, BYK 024 defoaming agent was added at 0.1 pph followed by 0.2 pph of BYK 346 surfactant. This mixture was agitated thoroughly on a vortexer for several minutes. Finally, 0.4 pph of Rheolate 210 thickener was added and the resulting formulation was agitated thoroughly.

Maple test panels were first treated with commercially available, water-based pre-stain wood conditioner, followed by a water-based stain, per manufacturer's instructions. After drying the stained panels for 3-4 hours, the panel was coated by first applying a bead of coating formulation to the top edge of the panel. The coating formulation was then spread across the sample with a #52 wire-wrapped drawdown rod. The coated panel was then dried at room temperature for 1 hour followed by aging at 60° C. for 4 hours.

Example 6

Preparation of Waterborne PU/PCL Blend Using a Different Molecular Weight PCL

A 500 ml three neck flask was immersed in an 85° C. oil bath and 49.05 g of polyol B1 (Fomrez 55-112) and 40.48 g of polyol B2 (Fomrez 55-225) were added; no solvent was used for this synthesis. 36.03 g of PCL (molecular weight=43,000-50,000) were added and stirred until PCL was completely dissolved. Then 8.1 g of 2,2-Bis(hydroxymethyl)-propionic acid (DMPA) was added during slow stirring until a homogeneous solution was obtained. At this time 1.35 g of 1,1,1-Tris(hydroxymethylpropane) (TMP) was added and stirred for 1~2 minutes. After that, 81.0 g of Meta-Tetramethylxylylene Diisocyanate (TMXDI) monomer (from Cytec Industries Inc.) were charged to the solution and the reaction temperature was increased to 120° C. After 2 hours of reaction, a urethane prepolymer was formed in the presence of PCL. The reaction temperature was decreased to 85° C. and 7.326 g of triethylamine was added to the reaction mixture and stirred for 30 minutes. Finally, the temperature was increased to 120° C. in order to decrease viscosity to allow for facile dispersion into water.

In a separate 1 liter plastic container, 445 ml deionized water, 10 g of Carbowet 13-40 surfactant, and 1 ml Byk 024 defoamer were added. The hot prepolymer resin mixture was poured slowly in a stream into the water under vigorous stirring. Stirring continued for 30 minutes after all the resin was poured in. A 25% of amine chain extender solution was prepared and set aside by combining 14.562 g of 2-methyl-1,5-pentanediamine (Dytek A, obtained from Aldrich) and 43.7 g of de-ionized water. The amine solution was added dropwise into the dispersion. The end of the reaction was determined by monitoring the disappearance of the isocyanate group (2250 cm$^{-1}$) through Fourier transform infrared spectroscopy (FTIR).

Example 7

Preparation of Waterborne PU/PCL Blend Using a Different Polyol Ratio

A 500 ml three neck flask was immersed in an 85° C. oil bath and 24.52 g of polyol B1 (Fomrez 55-112) and 52.74 g of polyol B2 (Fomrez 55-225) were added; no solvent was used for this synthesis. 33.54 g of PCL (molecular weight=43,000-50,000) were added and stirred until PCL was completely dissolved. Then 8.1 g of 2,2-Bis(hydroxymethyl)-propionic acid (DMPA) was added during slow stirring until a homogeneous solution was obtained. At this time 1.35 g of 1,1,1-Tris(hydroxymethylpropane) (TMP) was added and stirred for 1~2 minutes. After that, 81.0 g of Meta-Tetramethylxylylene Diisocyanate (TMXDI) monomer (from Cytec Industries Inc.) were charged to the solution and the reaction temperature was increased to 120° C. After 2 hours of reaction, a urethane prepolymer was formed in the presence of PCL. The reaction temperature was decreased to 85° C. and 7.326 g of triethylamine was added to the reaction mixture and stirred for 30 minutes. Finally, the temperature was increased to 120° C. in order to decrease viscosity to allow for facile dispersion into water.

In a separate 1 liter plastic container, 445 ml deionized water, 10 g of Carbowet 13-40 surfactant, and 1 ml Byk 024 defoamer were added. The hot prepolymer resin mixture was poured slowly in a stream into the water under vigorous stirring. Stirring continued for 30 minutes after all the resin was poured in. A 25% of amine chain extender solution was prepared and set aside by combining 14.562 g of 2-methyl-1,5-pentanediamine (Dytek A, obtained from Aldrich) and 43.7 g of de-ionized water. The amine solution was added dropwise into the dispersion. The end of the reaction was determined by monitoring the disappearance of the isocyanate group (2250 cm$^{-1}$) through FTIR.

Example 8

Preparation of Waterborne PU/PCL Blend Containing POSS

A 500 ml three neck flask was immersed in an 85° C. oil bath and 49.05 g of polyol B1 (Fomrez 55-112) and 40.48 g of polyol B2 (Fomrez 55-225) were added; no solvent was used for this synthesis. 9.00 grams of TriSilanolIsobutyl POSS (Polyhedral Oligomeric Silsesquioxane, Hybrid Plastics) was then added with stirring to dissolve. 36.03 g of PCL (molecular weight=43,000-50,000) were added and stirred until PCL was completely dissolved. POSS is a cage like compound with silicon and oxygen as the basic elements and various organic groups providing reactive sites. The TriSilanolIsobutyl POSS used here has three OH groups that can react with isocyanate and thus be incorporated into the polyurethane chain. POSS can be used to adjust the properties of polyurethane such as hardness and abrasion resistance. Then 8.1 g of 2,2-Bis(hydroxymethyl)-propionic acid (DMPA) was added during slow stirring until a homogeneous solution was obtained. At this time 1.35 g of 1,1,1-Tris(hydroxymethyl-propane) (TMP) was added and stirred for 1~2 minutes. After that, 83.7 g of Meta-Tetramethylxylylene Diisocyanate (TMXDI) monomer (from Cytec Industries Inc.) were charged to the solution and the reaction temperature was increased to 120° C. After 2 hours of reaction, a urethane prepolymer was formed in the presence of PCL. The reaction temperature was decreased to 85° C. and 14.652 g of triethylamine was added to the reaction mixture and stirred for 30 minutes. Finally, the temperature was increased to 120° C. in order to decrease viscosity to allow for facile dispersion into water.

In a separate 1 liter plastic container, 445 ml deionized water, 10 g of Carbowet 13-40 surfactant, and 1 ml Byk 024 defoamer were added. The hot prepolymer resin mixture was poured slowly in a stream into the water under vigorous stirring. Stirring continued for 30 minutes after all the resin was poured in. A 25% of amine chain extender solution was prepared and set aside by combining 14.562 g of 2-methyl-1,5-pentanediamine (Dytek A, obtained from Aldrich) and 43.7 g of de-ionized water. The amine solution was added dropwise into the dispersion. End of the reaction was determined by monitoring the disappearance of the isocyanate group (2250 cm$^{-1}$) through FTIR.

Example 9

Preparation of UV-Curable Solvent Borne PU/PCL Resin and Coating of Wood Test Panels PCL was first dissolved in toluene. The PCL solution was then mixed with the polymer resin, photoinitiator and surface additives for film formation. This mixture is then ultrasonically homogenized, resulting in a transparent solution. The solution was then cast on a wooden substrate, flash dried and exposed to UV light to complete the curing. A procedure for preparing a UV-cured PU/PCL blend containing 25% PCL which is suitable for wood clear coating is described below.

A standard, solvent borne UV-cure coating formulation was prepared as follows. In a 20 cc vial, 3 g of Ebecryl 265, 12 g of Toluene, 0.22 g of Irgacure 184, 0.03 g of BYK 301, 0.03 g of BYK 306, and 1.3 g of PCL are combined. The vial is then covered with foil to protect from light and placed into an ultrasonic bath filled with warm water. The solution is ultrasonicated for 4 hrs, or until a homogeneous, transparent solution results.

Maple test panels were first treated with commercially available, water-based pre-stain wood conditioner, followed by a water-based stain, per manufacturer's instructions. After drying the stained panels for 3-4 hours, the panel was coated by first applying a bead of coating formulation to the top edge of the panel. The coating formulation was then spread across the sample with a #52 wire-wrapped drawdown rod. The coated panel was then dried at 70° C. for 1 hour followed by UV curing.

Testing and Examination of the Coating on Wood

In order to evaluate the self-healing performance of the nanocomposite coatings, painted samples were marred with one of two different abrasive surfaces. In the first test, samples were marred with extra fine 4-0 steel wool and then healed. By generating a very fine surface texture, the steel wool causes extensive haze to form in the otherwise glossy finish. Film gloss was recorded before and after the test to quantitatively determine the ability of the finish to be restored through self healing. The second test employed 240 grit sandpaper in a similar fashion, but used optical microscopy to qualitatively evaluate self healing. FIG. 1 illustrates the cross section of a typical scratch formed in this testing. Note that in both of these tests, material is largely displaced, and generally not removed from the system. Complete self-healing was achieved with these types of scratches. Obviously, when the material has been "gouged" out and removed permanently from the coating, complete self-healing cannot be expected.

Heat activated self-healing was performed by applying a 5 second burst of hot air with a heat gun from a distance of 1-2 inches to raise the surface temperature to 70-80° C. The panel was then allowed to cool to room temperature before being evaluated for extent of healing.

Self Healing-Assisted Steel Wool Mar Resistance

Figure 2:
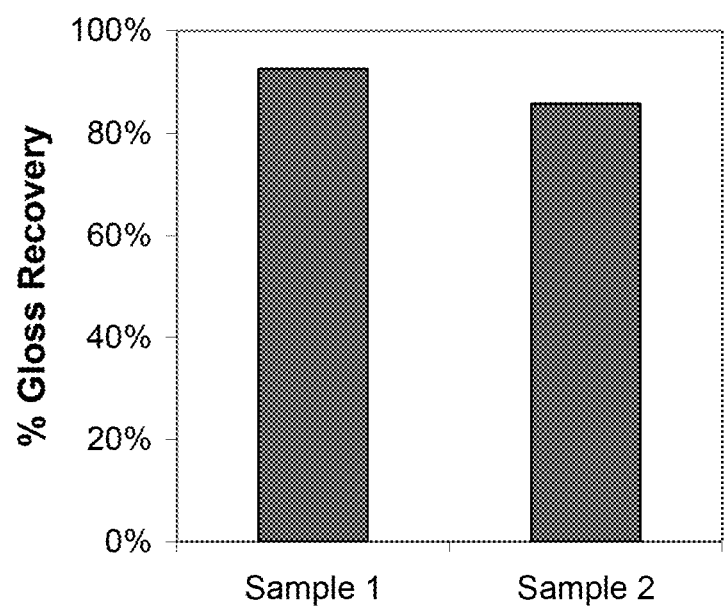
FIG. 2 illustrates percentage of gloss recovery for duplicate coated wood samples.

A steel wool mar test was conducted on coated wood panels. Coated surfaces were subjected to reciprocating abrasion by a pad of 4-0 steel wool under a constant load of 100 g. Each sample received 10 double-rubs and gloss was measured before marring and after healing of the marred area. The amount of recovered gloss was calculated with the following equation, and graphed in FIG. 2:

$$\% \text{ Gloss Recovery} = \frac{\text{Healed gloss}}{\text{Initial gloss}} \times 100\%$$

The initial gloss of the samples was in the range of 70-80 GU at 60°. The marring action resulted in a ~30% reduction in this gloss. This test demonstrated the ability of the self-healing coating to recover the original finish to between 85 and 95% of the original gloss value, with only a brief application of heat.

Self Healing-Assisted Sandpaper Mar Resistance

Figure 3:
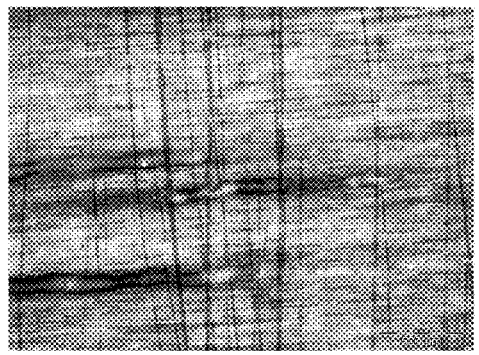
FIG. 3 illustrates optical micrographs of surface marring before and after self healing.
Figure 3:
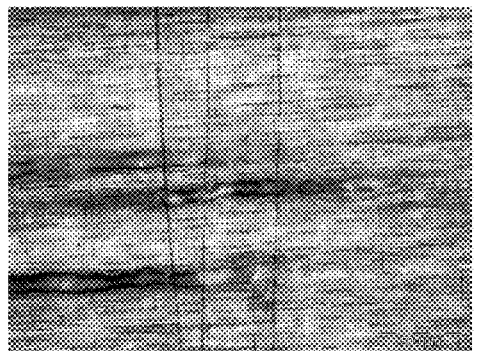

A second simple mar test was conducted on coated wood panels. Coated surfaces were subjected to reciprocating abrasion by a piece of 240 grit SiC sandpaper under light pressure. The abraded area was then imaged with an optical microscope before and after self healing with a heat gun. FIG. 3 compares the optical micrographs of the coating surface.

From these micrographs, it was evident that a majority of the scratches were healed completely with only a brief application of heat. Several deeper scratches remained, possibly due to coating removal, but were clearly reduced in severity by the crack closure healing mechanism.

Morphology of the PU/PCL Nanocomposite

Figure 4:
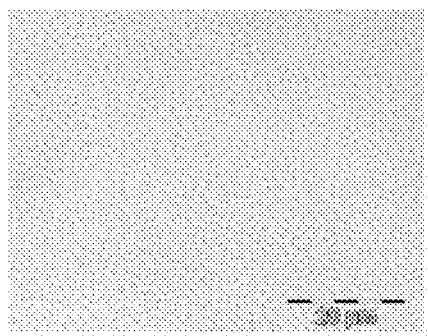
FIG. 4 illustrates transmission optical microscope images of the PU/PCL composites.
Figure 5A:
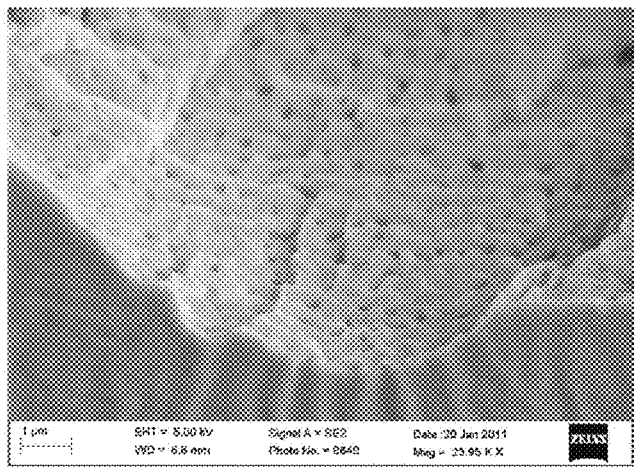
FIG. 5 illustrates SEM images of the solvent borne PU/PCL composites: (a) 10% PCL; (b) 20% PCL; (c) 30% PCL.
Figure 5B:
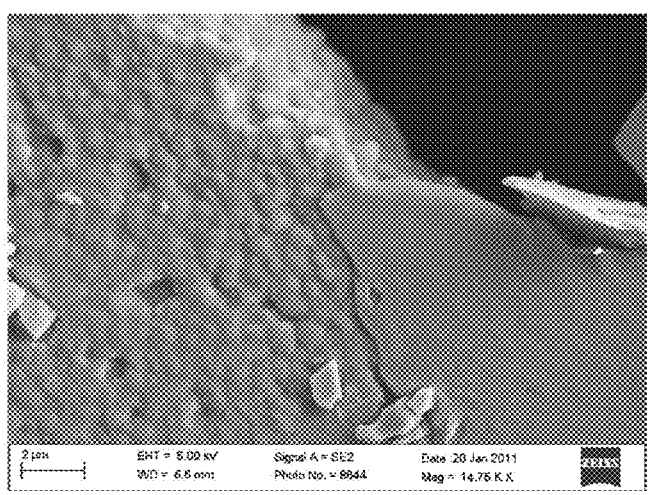
Figure 5C:
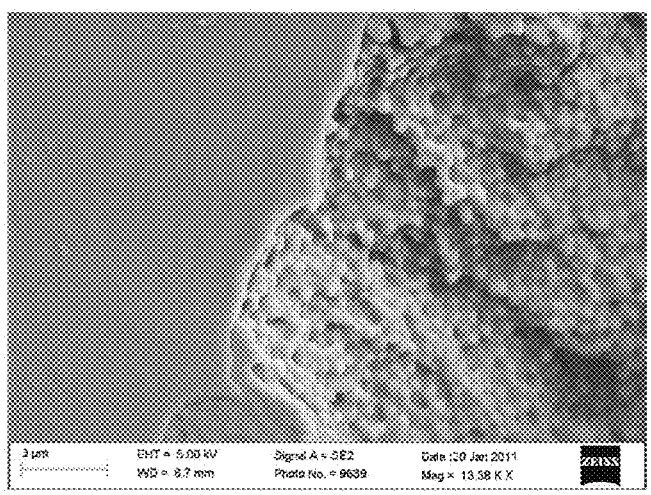

The morphology of the PU/PCL (20% PCL) nanocomposite was examined using the transmission optical microscopic images (FIG. 4). The dark phase is polyurethane and the light phase is PCL. It is clear that at this composition (20% PCL) PCL is the matrix phase while polyurethane is the dispersed phase. The size of the PCL spheres is less than one micron. It should be noted that this phase separated morphology is only achieved with the phase separation via reaction process at certain temperature ranges. In addition, the phase separated morphology is sensitive to the composition. To illustrate this, we look at the SEM images of the PU/PCL composites with different PCL concentrations. In order to differentiate the polyurethane phase and the PCL phase, the PU/PCL composite coatings were soaked in chloroform for 30 minutes to etch out the PCL phase. FIG. 5 shows the SEM images of solvent borne thermally cured PU/PCL coatings with PCL concentrations of 10%, 20%, and 30%. For the composition with 10% PCL, a continuous matrix with holes morphology was observed. The matrix was polyurethane and the holes were the loci of the PCL particles which had been etched out. When PCL concentrations were greater or equal than 20%, a totally different morphology was observed. The thermoset polyurethane phase became particles while PCL became the matrix phase. The morphologies of the compositions with 20% and 30% of PCL are similar. In all these compositions, the size of nanosized features were well below 1 µm. This is important to maintain the transparency of the coating.

We have determined the glass transition temperatures and melting temperatures of the PU/PCL nanocomposites with three different PCL concentrations (10%, 20%, and 30%) using DSC. The measured $T_g$ and $T_m$ for the three compositions of PU/PUL nanocomposite are listed in Table I. It can be seen from the table that the high temperature glass transition of the PU/PCL nanocomposites are very close to that of the polyurethane. Although $T_g$ decreases slightly with increasing PCL content, it does not decrease in proportion to the increased PCL content. In addition, the melting points of the nanocomposites are close to that of pure PCL. Both of these observations are indicative of a phase separated system.

TABLE I

Glass transition temperature and melting temperature as measured by DSC.

| Polymer | $T_g$ | $T_m$ |
| --- | --- | --- |
| PU | 36.6 | |
| PU/PCL (10%) | 38.9 | 50.2 |
| PU/PCL (20%) | 35.5 | 52.5 |
| PU/PCL (30%) | 32.8 | 52.3 |
| PCL | | 56.1 |

The present invention has been described with respect to the above exemplary embodiments. However, as those skilled in the art will recognize, modifications and variations in the specific details which have been described may be resorted to without departing from the spirit and scope of the invention as defined in the appended claims.

We claim:

1. A method for providing a self-healing polymeric water borne wood coating comprising the steps of:
    a) mixing a water incompatible polycaprolactone (PCL) thermoplastic with at least one polyol monomer of a thermoset;
    b) adding a dihydroxyl carboxylic acid and a crosslinker to the mixture;
    c) adding an isocyanate monomer to the mixture;
    d) forming a thermoset prepolymer with terminating isocyanate groups by heating the mixture;
    e) adding a tertiary amine to the mixture to neutralize the acid groups from the dihydroxyl carboxylic acid;
    f) pouring the neutralized hot prepolymer/PCL thermoplastic mixture into water with agitation to form an emulsion;
    g) adding a chain extending amine to the emulsion;
    h) coating the emulsion unto a wood surface; and
    i) curing the coated emulsion so as to form a transparent coating on the wood surface having a unique thermoset and thermoplastic phase separated structure formed by phase separation during the curing reaction with the phase separated features being under 1 micron in size, wherein the thermoset forms a load-bearing phase performing major mechanical and structural functions and wherein the PCL thermoplastic forms a self-healing phase to repair cracks and other damages in the material to restore its mechanical and structural integrity after damage.

2. The method for providing a self-healing polymeric water borne wood coating as claimed in claim 1 wherein the thermoset material is selected from the group of: polyurethane, epoxy, bis-maleimide, phenol-formaldehyde, urea-formaldehyde, melamine-formaldehyde, polyimide, alkyd, unsaturated polyester, silicone, fluoropolymers, and polyvinyl formal and blends thereof.

3. The method for providing a self-healing polymeric water borne wood coating as claimed in claim 1 further including the step of adding nanoparticles to the PCL thermoplastic.

4. The method for providing a self-healing polymeric water borne wood coating as claimed in claim 1 wherein the dihydroxyl carboxylic acid is at least one of: 2,2-Bis(hydroxymethyl)-propionic acid (DMPA), 2,3-dihydroxyl propionic acid, 2,2-bis(hydroxymethyl)propionic acid, dimethylol butanoic acid, 2,2-bis(hydroxymethyl) butyric acid (DMBA), dihydroxybenzoic acid, and dihydroxysuccinic acid.

5. The method for providing a self-healing polymeric water borne wood coating as claimed in claim 1 wherein the crosslinker is at least one of 1,1,1-Tris(hydroxymethylpropane), trimethylolpropane, trimethylolethane, trimethylolbutane, and glycerol.

6. The method for providing a self-healing polymeric water borne wood coating as claimed in claim 1 wherein the isocyanate monomer is Meta-Tetramethylxylylene Diisocyanate (TMXDI).

7. The method for providing a self-healing polymeric water borne wood coating as claimed in claim 1 wherein the tertiary amine is at least one of trimethylamine, triethylamine, dimethylaniline, diethylaniline, triphenylamine, and dimethylbenzylamine.

8. The method for providing a self-healing polymeric water borne wood coating as claimed in claim 1 wherein the chain extending amine is at least one of 2-methyl-1,5-pentanediamine, diethanolamine, di-n-propanolamine, diisopropanolamine, diethylenetriamine, triethylenetetraamine, and 1,3-diaminopentane (DAMP).

9. The method for providing a self-healing polymeric water borne wood coating as claimed in claim 1 wherein the molecular weight of the PCL thermoplastic is in the range of 1000 to 100,000.

10. The method for providing a self-healing polymeric water borne wood coating as claimed in claim 1 wherein the molecular weight of the PCL thermoplastic is 10,000 to 50,000.

11. The method for providing a self-healing polymeric water borne wood coating as claimed in claim 3 wherein the nanoparticle additive is at least one of: an organo-modified clay, metal oxide, organo-modified metal oxide, graphene, and carbon nanotubes.

12. A method for providing a self-healing polymeric water borne wood coating for application to a wood surface and subsequent curing, comprising the steps of:
    a) mixing a water incompatible polycaprolactone (PCL) thermoplastic with at least one polyol monomer of a thermoset;
    b) adding a dihydroxyl carboxylic acid and a crosslinker to the mixture;

c) adding an isocyanate monomer to the mixture;
d) forming a thermoset prepolymer with terminating isocyanate groups by heating the mixture;
e) adding a tertiary amine to the mixture to neutralize the acid groups from the dihydroxyl carboxylic acid;
f) pouring the neutralized hot prepolymer/PCL thermoplastic mixture into water with agitation to form an emulsion;
g) adding a chain extending amine to the emulsion to form a pre-coating for application to a wood surface and curing in-situ.

13. The method for providing a self-healing polymeric water borne wood coating as claimed in claim 12 wherein the molecular weight of the PCL thermoplastic is 10,000 to 50,000.

14. The method for providing a self-healing polymeric water borne wood coating as claimed in claim 12 further including the step of adding nanoparticles to the PCL thermoplastic.

15. The method for providing a self-healing polymeric water borne wood coating as claimed in claim 14 wherein the nanoparticle additive is at least one of: an organo-modified clay, metal oxide, organo-modified metal oxide, graphene, and carbon nanotubes.

16. The method for providing a self-healing polymeric water borne wood coating as claimed in claim 12 wherein the thermoset material is selected from the group of: polyurethane, epoxy, bis-maleimide, phenol-formaldehyde, urea-formaldehyde, melamine-formaldehyde, polyimide, alkyd, unsaturated polyester, silicone, fluoropolymers, and polyvinyl formal and blends thereof.

17. A method for providing a self-healing polymeric water borne wood coating for application to a wood surface and subsequent curing, comprising the steps of:
a) mixing a water incompatible thermoplastic having a molecular weight of 10,000 to 50,000 with at least one polyol monomer of a thermoset;
b) adding a dihydroxyl carboxylic acid and a crosslinker to the mixture;
c) adding an isocyanate monomer to the mixture;
d) forming a thermoset prepolymer with terminating isocyanate groups by heating the mixture;
e) adding a tertiary amine to the mixture to neutralize the acid groups from the dihydroxyl carboxylic acid;
f) pouring the neutralized hot prepolymer/thermoplastic mixture into water with agitation to form an emulsion;
g) adding a chain extending amine to the emulsion to form a pre-coating for application to a wood surface and curing in-situ.

18. The method for providing a self-healing polymeric water borne wood coating as claimed in claim 17 wherein the thermoplastic material is polycaprolactone (PCL).

19. The method for providing a self-healing polymeric water borne wood coating as claimed in claim 17 further including the step of adding nanoparticles to the thermoplastic.

20. The method for providing a self-healing polymeric water borne wood coating as claimed in claim 19 wherein the nanoparticle additive is at least one of: an organo-modified clay, metal oxide, organo-modified metal oxide, graphene, and carbon nanotubes.

21. The method for providing a self-healing polymeric water borne wood coating as claimed in claim 17 wherein the thermoset material is selected from the group of: polyurethane, epoxy, bis-maleimide, phenol-formaldehyde, urea-formaldehyde, melamine-formaldehyde, polyimide, alkyd, unsaturated polyester, silicone, fluoropolymers, and polyvinyl formal and blends thereof.

22. A method for providing a self-healing polymeric water borne wood coating comprising the steps of:
a) mixing a water incompatible thermoplastic having a molecular weight of 10,000 to 50,000 with at least one polyol monomer of a thermoset;
b) adding a dihydroxyl carboxylic acid and a crosslinker to the mixture;
c) adding an isocyanate monomer to the mixture;
d) forming a thermoset prepolymer with terminating isocyanate groups by heating the mixture;
e) adding a tertiary amine to the mixture to neutralize the acid groups from the dihydroxyl carboxylic acid;
f) pouring the neutralized hot prepolymer/thermoplastic mixture into water with agitation to form an emulsion;
g) adding a chain extending amine to the emulsion:
h) coating the emulsion unto a wood surface; and
i) curing the coated emulsion so as to form a transparent coating on the wood surface having a unique thermoset and thermoplastic phase separated structure formed by phase separation during the curing reaction with the phase separated features being under 1 micron in size, wherein the thermoset forms a load-bearing phase performing major mechanical and structural functions and wherein the thermoplastic forms a self-healing phase to repair cracks and other damages in the material to restore its mechanical and structural integrity after damage.

23. The method for providing a self-healing polymeric water borne wood coating as claimed in claim 22 wherein the thermoplastic material is polycaprolactone (PCL).

24. The method for providing a self-healing polymeric water borne wood coating as claimed in claim 22 further including the step of adding nanoparticles to the thermoplastic.

25. The method for providing a self-healing polymeric water borne wood coating as claimed in claim 24 wherein the nanoparticle additive is at least one of: an organo-modified clay, metal oxide, organo-modified metal oxide, graphene, and carbon nanotubes.

26. The method for providing a self-healing polymeric water borne wood coating as claimed in claim 22 wherein the thermoset material is selected from the group of: polyurethane, epoxy, bis-maleimide, phenol-formaldehyde, urea-formaldehyde, melamine-formaldehyde, polyimide, alkyd, unsaturated polyester, silicone, fluoropolymers, and polyvinyl formal and blends thereof.

* * * * *